May 16, 1950     P. H. UNSINGER     2,507,872
IMPLEMENT OR TOOLHOLDER
Filed Jan. 18, 1946
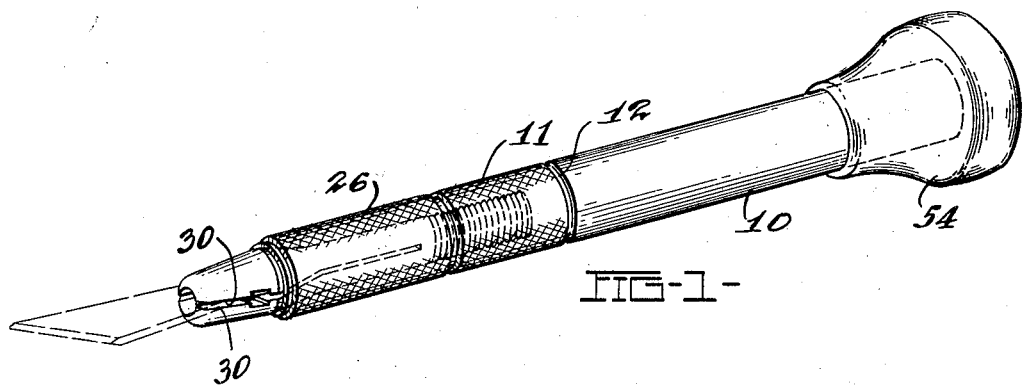
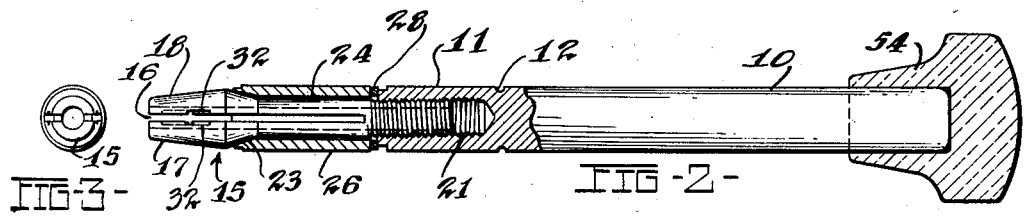
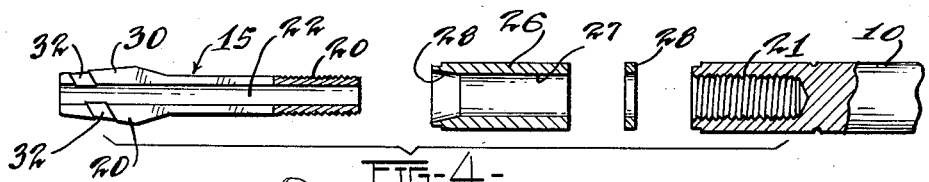
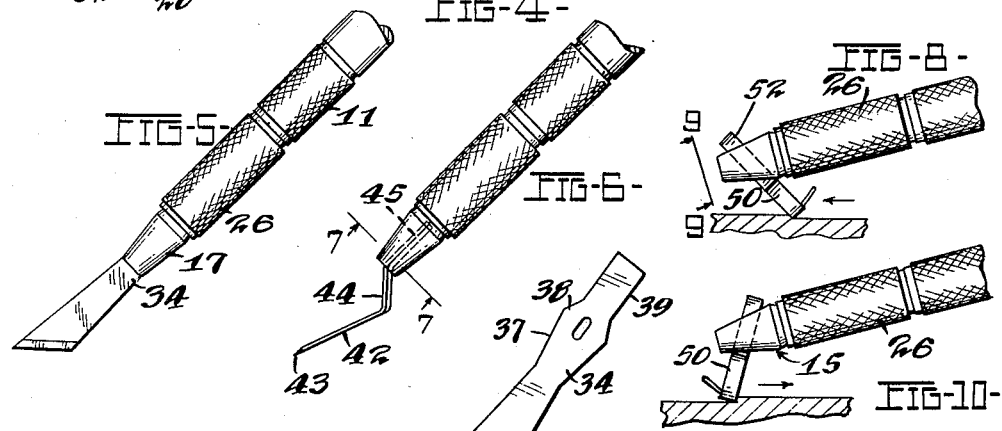
INVENTOR.
PHILLIP H. UNSINGER
BY *Harry C. Ernsberger*
ATTORNEY.

Patented May 16, 1950

2,507,872

UNITED STATES PATENT OFFICE 2,507,872

IMPLEMENT OR TOOLHOLDER

Philip H. Unsinger, Fremont, Ohio, assignor to Unsinger-AP Corporation, a corporation of Ohio Application January 18, 1946, Serial No. 642,016

1 Claim. (Cl. 279—53)

This invention relates to tool or implement holders and more especially to holders of a character adapted to support interchangeable tools of various types utilized for performing manual operations upon work.

The invention embraces the provision of a tool holder having readily manipulatable means for securing or affixing a tool in the holder whereby the tool will be rigidly supported during use.

An object of the invention is the provision of a holder for tools or instrumentalities embodying a tool or instrumentality retaining means for accommodating various types of tools which are retained or secured in the holder in a manner most facile to their utility.

Another object of the invention is the provision of an implement holder provided with a jaw chuck arrangement adapted to carry and support tools having different types of shank construction.

A further object of the invention is the provision of an implement holder embodying an implement supporting collet means wherein the said means is arranged for cooperation with a sleeve for contacting the collet means by relative movement between a body portion of the handle and the collet means wherein a large implement clamping area is provided.

Still another object of the invention resides in the provision of a tool holder adapted to interchangeably receive and support a plurality of different types of tools for performing such manual operations as carving, cutting, chiseling, routing, gouging, sawing, filing and the like upon various kinds of materials.

Another object resides in the provision of a removable cap for the tool supporting means which may be affixed in operative position to provide an increased area of grip or hand portion for the tool supporting means when the same is used with tools requiring a large amount of longitudinal pressure in manipulating the tool as may be required in such operations as carving, routing, chiseling or gouging and the like.

Still a further object is the provision of a tool holder adaptable to carry and support manual tools wherein the tool holder is provided with simple yet effective tool clamping means which may be readily manipulated by the tool user for purposes of quickly interchanging tools of various sizes and types.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawing of a form of the invention, which may be preferred, in which:

Figure 1 is a isometric view illustrating a form of tool or implement holder of my invention;

Figure 2 is a longitudinal sectional view through the tool holder arrangement shown in Figure 1;

Figure 3 is an end elevational view showing implement supporting means of the holder;

Figure 4 is an expanded sectional view illustrating elements of the implement holder in disassembled condition;

Figure 5 is a view of a portion of the tool holder illustrating one form of tool adapted to be carried by the holder;

Figure 6 is a view similar to Figure 5 illustrating a different form of tool supported in the tool holder;

Figure 7 is an enlarged transverse sectional view taken substantially on the line 7—7 of Figure 6;

Figure 8 is a view showing a portion of the tool holder supporting a different type of tool;

Figure 9 is an enlarged end view of the tool holder and tool illustrated in Figure 8;

Figure 10 is a view similar to Figure 8 illustrating still a further type of tool and the manner of mounting same in the tool holder, and Figure 11 is a plan view of a flat shank tool usable with the holder.

While the implement holder of my invention is especially configurated for carrying or supporting small tools adapted for performing operations upon wood work or the like, but it is to be understood that I contemplate adaptation of my invention with any instrumentalities with which the same may be found to have utility.

Referring to the drawings in detail, the tool or implement holder is inclusive of a cylindrical body portion 10, the forward portion 11 of which is preferably knurled and which is defined with respect to the smooth cylindrical portion 10 by means of a circumferential kerf or groove 12.

The holder is provided with an implement carrying chuck or member 15 preferably fabricated as a single element which is formed throughout a portion of its length with a longitudinally extending kerf or slot 16 producing the clamping jaws 17 and 18. The rear portion of the chuck 15 is threaded as at 20 which portion is adapted to be received in a threaded bore 21 formed interiorly in the forward portion of the body or handle portion 10. The chuck 15 is formed with a longitudinal bore 22 extending throughout its length, the bore 22 and jaw portions 17 and 18 resembling a collet-like formation.

The chuck 15 is formed with an intermediate tapered or frusto-conically shaped portion 23 which joins the exterior tapered portions 19 of the jaws 17 and 18 with the cylindrical or shank portion 24. Surrounding the portions 23 and 24 is a locking collar or sleeve 26 having an interior cylindrical surface 27 and a tapered surface 28 at one end thereof. Interposed between the rear extremity of sleeve 26 and the forward end of the body 10 is a washer or annulus 31 preferably formed of hardened metal to provide durable wearing surfaces between the ends of sleeve 26 and holder 10. These elements are shown in assembled relation in Figures 1 and 2 and in disassembled condition in Figure 4.

The interior flat surfaces 30 of the chuck jaws 17 and 18 formed by the kerf or slot 16 provide clamping surfaces for retaining certain types of tool shanks while the opposed semi-cylindrical configurations formed in the clamping jaws are adaptable to receive and retain other types of tool shank configurations. As particularly shown in Figures 2 and 4 the interior portions of jaws 17 and 18 are provided with angularly or diagonally arranged registering recesses or slots 32 which intersect the bore 22, the walls of the recesses 32 forming clamping surfaces arranged to receive the tool shanks of the tools wherein the tool shanks may be angularly arranged with respect to the axis of the tool handle or support for purposes to be hereinafter explained.

The particular form of implement or tool holder of my invention is adaptable for carrying or mounting various types and forms of tools suitable for various purposes. As illustrated in Figures 1 and 5 the parallel interior flat surfaces 30 of the clamping jaws 17 and 18 of the tool supporting element 15 are adapted to accommodate a tool having a flat or bar-like shank 34 formed with an edge configuration of tapered portions 27, 38 and extension 39, the edges of which follow generally the exterior contour or silhouette of the chuck 15, the tapered edges 38 being substantially coincidental with the tapered exterior walls of the clamping portions 17 and 18 of the chuck while the edges 38 are substantially coincidental with the contour of portions 23 and 24 of the chuck 15. The edge portions 38 which when the tool 34 is in assembled position as shown in Figures 1 and 5, would be coincidental with the tapered portion 23 so that when the knife blade is in assembled position in the holder, and the sleeve 26 moved forwardly into engagement with tapered portion 23 by threading the holder 10 on to the threaded shank 20 of the chuck or tool supporting element 15, there will be no transverse looseness or lost motion of the knife blade when the same is securely clamped between the jaws 17 and 18. This condition obtains because the edges 38 and 39 of the blade coincide with the tapered cylindrical walls of portions 23 and 24 of the chuck 15 and are embraced by the inner walls of the sleeve 26.

Figures 6 and 7 illustrate the holder as supporting a different type of tool. As illustrated, the tool 42 is of chisel-like configuration having a cutting edge 43, body portion 44 and a supporting shank 45. The portions 44 and 45 of the tool are formed with depressed central portions 46 so that when the shank 45 of the tool is inserted longitudinally in the clamping jaws 17 and 18 of the tool holder, the depressed portion 46 lies within the bore 22 in chuck while the uniplanar portions 47 at either side of the depressed portion 46 lie between the uniplanar surfaces 30 of the chuck jaws 17 and 18. Thus a tool or instrumentality having this type of shank construction, when inserted in the tool holder and the clamping jaws 17 and 18 tightened or drawn down upon the shank, will be securely retained in the chuck against longitudinal and lateral motion, in this manner providing a rigid connection between the tool and holder. The tool may be easily and quickly released by simply rotating the body 10 in an opposite direction with respect to the threaded portion of the chuck 15 so that the sleeve 26 may be moved away from the tapered portions 23 of the chuck jaws.

Figures 8 to 10 inclusive illustrate a further use of the tool holder of my invention with a tool of the router type. A tool 50 of this type is formed with a cutting configuration 51 particularly adaptable for performing routing operations. The tool is provided with a bar-like shank portion 52 which may be of laminated formation by folding the metal, from which the tool is formed upon itself to attain a desirable thickness and rigidity for the tool shank 52. This type of tool may be inserted in the tool holder as shown in Figures 8 and 10, by inserting the tool shank into the recesses 32 diagonally formed in the chuck jaws 17 and 18. This form of tool is clamped into the jaws of the tool holder in the same manner as hereinbefore explained in connection with other types of tools. The router type tool may, if desired, be secured in the tool holder in still another manner i. e., by inserting the shank 52 of the tool longitudinally of the tool holder into the bore 22 with the opposed edges of the tool shank construction in engagement with the semi-cylindrical recesses formed in each of the jaws 17 and 18 by the bore 22.

In many uses of the tool holder, it is desirable to exert considerable pressure upon the tool, particularly in carving and gouging operations. To facilitate such uses of the holder, I have provided a button or grip member 54 which snugly fits over the end of the body portion 10 as shown in Figure 1. The grip member 54 may be made of any suitable material, as for example, molded plastic, the recess in the grip portion being of a dimension to be slidably, yet snugly received on the body 10 and be retained thereon by friction. The grip portion 54 may be readily removed when its use is not desired.

It is to be understood that while I have illustrated the holder of my invention as usable with several forms of carving tools, I do not wish to limit my invention to the uses described and I contemplate utilization of the tool holder with any other types of tools with which it may be found to be adaptable.

It is apparent that within the scope of the invention, modifications and different arrangements may be made other than is herein disclosed, and the present disclosure is illustrative merely, the invention comprehending all variations thereof.

What I claim is:

An implement supporting means comprising an element integrally formed with a pair of implement engaging jaw portions; each of the inner opposed surfaces of the jaw portions being formed with a semi-cylindrical longitudinally extending recess; each of said inner opposed surfaces of said jaw portions being formed with a groove of rectangular cross section; said grooves extending in parallel relationship and disposed at an acute angle with respect to the longitudinal axis of said recesses, and means engageable with the exterior surfaces of said element for moving the jaw portions toward one another.

PHILIP H. UNSINGER.

REFERENCES CITED

The following references are of record in the file of this patent:

UNITED STATES PATENTS

| Number | Name | Date |
|---|---|---|
| 207,620 | Parmelee | Sept. 3, 1878 |
| 337,245 | Chantrell | Mar. 2, 1886 |
| 594,919 | Teske | Dec. 7, 1897 |
| 855,280 | Campbell | May 28, 1907 |
| 1,756,773 | Wendt | Apr. 29, 1930 |
| 1,826,567 | Payer | Oct. 6, 1931 |